United States Patent Office

3,847,885
Patented Nov. 12, 1974

3,847,885
DEWATERING ACRYLONITRILE POLYMERS
James Bruce Peeso, Jr., Norwalk, Conn., assignor to American Cyanamid Company, Stamford, Conn.
No Drawing. Filed May 21, 1973, Ser. No. 362,121
Int. Cl. C08f 3/76, 15/02, 15/22
U.S. Cl. 260—85.5 R          5 Claims

ABSTRACT OF THE DISCLOSURE

Acrylonitrile polymer crumb from polymerizing acrylonitrile in an aqueous medium is dewatered by heating an aqueous slurry thereof under pressure and with agitation to a temperature above, but not more than about 20° C. above, the minimum melting temperature of the polymer in the presence of water, then cooling the aqueous slurry, and separating the polymer from the excess liquid of the slurry.

---

This invention relates to a process for dewatering acrylonitrile polymer crumb produced by polymerizing acrylonitrile in an aqueous medium. More particularly, this invention relates to reducing the water content of such acrylonitrile polymer crumb to a level appreciably lower than can be obtained by merely filtering or centrifuging an aqueous slurry of such cumb without fully drying such crumb, such reduced level in the dewatered acrylonitrile polymer being generally in the range of about 15%–35% water, preferably below 30% water.

To make shaped articles, such as fibers, filaments, films, etc., of acrylonitrile polymer, it is first necessary to polymerize acrylonitrile, alone or in combination with one or more other monoethylenically unsaturated comonomers to form the polymer. Usually the polymerization reaction is conducted in an aqueous medium wherein the monomers, in the presence of catalyst, react to form polymer. Thereafter, the resulting polymer crumb is recovered from the aqueous polymerization slurry by suitable solid-liquid separation means, such as filtration or centrifugation. This solid polymer crumb usually contains about 40% to about 80% water with about 60% to about 20% polymer.

In the usual spinning processes for converting acrylonitrile polymer from crumb to fiber, it is necessary to dissolve the polymer in a suitable solvent. Two types of suitable solvents are in commercial use, (a) organic solvents such as dimethylacetamide or dimethylformamide and (b) concentrated aqueous solutions of inorganic compounds such as sodium thiocyanate, zinc chloride, or nitric acid. Many other suitable solvents for acrylonitrile polymers in each category are known and described in published materials, but are not in widespread commercial use.

Before dissolving the acrylonitrile polymer crumb in an organic solvent, the crumb must have its water content reduced from the about 40% to about 80% water it usually contains after filtration or centrifugation of the aqueous polymerization slurry to dryness or less than about 10% water (See U.S. Pat. 3,313,758, column 1, lines 38–52, for instance). This necessary step is generally accomplished by evaporation of water from the polymer crumb although other procedures, such as taught in said U.S. Pat. 3,313,758, have been disclosed.

To serve as solvents for acrylonitrile polymers, aqueous solutions of inorganic compounds, such as sodium thiocyanate, zinc chloride, nitric acid, etc., must be very concentrated. If water is introduced with the polymer in the step of dissolving the polymer in its solvent, the aqueous solution of the inorganic compound used must be even more concentrated so that, after dilution during the dissolving step, it is sufficiently concentrated to serve as solvent. Since the concentration of inorganic compound required for solvent capability is close to the saturation limit, the amount of water in the polymer crumb preferably should be reduced to as low a level as feasible before dissolving, although complete dehydration is neither necessary or desirable for this purpose. However, other techniques, such as addition of extra dry solvent salt to the solvent solution may also be utilized, but this introduces other complexities into the dissolving process.

In the conventional processes for making shaped articles, such as fibers, films, filaments, etc., from acrylonitrile polymers, it is necessary or desirable to greatly reduce the water content of the acrylonitrile polymer crumb produced by polymerizing acrylonitrile, alone or with other monoethylenically unsaturated comonomers polymerizable therewith, in an aqueous medium. It is an object of the present invention to provide a novel process for dewatering such polymer crumb.

Evaporation drying of polymer crumb is well known. As pointed out in said U.S. Pat. 3,313,758, the evaporative drying step is usually an expensive operation, often resulting in over-heating and discoloration of the polymer. Evaporative drying of polymer crumb is also a time-consuming operation. It is another object of this invention to dewater such polymer without the necessity of an evaporative drying step. It is yet another object of this invention to dewater such polymer rapidly to minimize the time of exposure of polymer to elevated temperature.

The use of chemical treatments to dewater polymer crumb has also been proposed. However, this requires recovery of the chemicals utilized in such treatments. Such recovery processes add to the expenses of preparing the acrylonitrile polymer products and contribute to pollution of the atmosphere, lakes, streams, etc. It is yet another object of this invention to dewater such polymer without the necessity of introducing chemical treatments.

In accordance with the present invention, acrylonitrile polymer crumb produced by polymerizing acrylonitrile, alone or with other monoethylenically unsaturated comonomers copolymerizable therewith, in an aqueous medium is dewatered by heating an aqueous slurry of the crumb to a temperature above the minimum melting temperature of the polymer in the presence of water (but not more than about 20° C. above such minimum melting temperature) while the slurry is under a pressure at least equal to the vapor pressure of water at the slurry temperature and while the slurry is agitated sufficiently to prevent substantial coalescence of the polymer followed by cooling the slurry to below the minimum melting temperature while continuing said agitation and thereafter separating the resulting polymer particles from the excess liquid of the slurry, as by centrifuging or filtering.

As pointed out previously, the acrylonitrile polymer crumb recovered from the aqueous polymerization slurry normally contains about 40% to about 80% water even after filtration or centrifugation. Surprisingly and unexpectedly, it was discovered that this heating step in the presence of excess water followed by cooling permitted recovery of acrylonitrile polymer particles by filtration or centrifugation which only contained about 15% to about 35% water, preferably less than about 30% water.

The acrylonitrile polymers which can be used in the practice of this invention are those polymers or blends of polymers containing greater than about 50% combined acrylonitrile. In addition to homopolyacrylonitrile, copolymers of acrylonitrile with one or more copolymerizable mono-olefinic monomers can be used. Such monomers include acrylic, alphachloroacrylic and methacrylic acids, the methacrylates, such as methyl methacrylate, ethyl methacrylate, butyl methacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro - 1 - bromoethylene, methacrylonitrile, acrylamide and methacrylamide; alpha1chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic esters; N-vinylcarbazole; vinylfuran; alkyl vinyl ethers; vinyl sulfonic acids, such as vinyl sulfonic acid, styrene sulfonic acid, methallyl sulfonic acid, p-methallyloxy benzene sulfonic acid and their salts; ethylene alpha, beta-dicarboxylic acids or their anhydrides or derivatives, such as diethyl citraconate, diethyl mesaconate; styrene; vinylnaphthalene; vinyl-substituted tertiary heterocyclic amines such as the vinylpyridines and alkyl-substituted vinylpyridines for example, 2-vinylpyridine, 4-vinylpyridine, 2-methyl-5-vinylpyridine, and the like; 1-vinylimidazole and alkyl-substituted 1-vinylimidazoles, such as 2-, 4-, or 5-methyl-1-vinylimidazole, vinyl-pyrrolidone, vinyl-piperidone; and other mono-olefinic copolymerizable monomeric materials.

The acrylonitrile polymers useful in the practice of the present invention are prepared by an aqueous polymerization procedure. In such well-known procedures, monomers are converted to polymer in an aqueous medium in contact with catalyst. Among the well-known catalysts are ultraviolet radiation, oxidizing agents, redox systems, and other free-radical catalysts some of which are described in U.S. Pats. 2,436,926; 2,462,354; 2,640,049; 2,673,192; 2,748,106; 2,751,374; 2,777,832; 2,840,550; 2,891,035; and numerous others, many of which also describe various aqueous polymerization procedures. As produced, the acrylonitrile polymer (which is insoluble in the aqueous polymerization medium) exists as a slurry of crumb in the aqueous polymerization medium which also contains dissolved therein such materials as unreacted monomers, catalyst residues, short-stopping agents if such were utilized, etc. Usually such acrylonitrile polymer crumb is recovered from the aqueous polymerization medium by filtering or centrifuging (which may include water washing to remove the materials dissolved in the aqueous polymerization medium adhering to the polymer crumb). After such conventional recovery processing, it has been found that the acrylonitrile polymer crumb still contains about 40% to about 80% water on weight of crumb (equal to about 67% to about 400% water on weight of bone-dry polymer).

In accordance with the present invention, the water content of acrylonitrile polymer crumb produced by polymerization in an aqueous medium is reduced by heating an aqueous slurry of such crumb to a temperature above the minimum melting temperature of such polymer in the presence of water but not more than about 20° C. above such minimum melting temperature while under a pressure at least equal to the vapor pressure of water at the slurry temperature and while agitating the slurry sufficiently to prevent substantial coalescence of the polymer, then cooling the slurry to below said minimum melting temperature while continuing to agitate the slurry sufficiently to prevent substantial coalescence of polymer particles, and thereafter separating the solid polymer particles from the excess liquid of the slurry.

The aqueous slurry of acrylonitrile polymer crumb is preferably prepared by mixing together polymer crumb recovered from the aqueous polymerization slurry, as by filtration or centrifugation, with sufficient water that the slurry contains only about 1% to about 10% by weight of polymer. More water may be present in the slurry although such is not usually desired since such excess water must be heated and cooled as well as circulated around resulting in increased energy consumption. Less water may also be used, although enough water must be present to ensure that the slurry remains easily flowable and to assist in preventing substantial coalescence of polymer during the heating and cooling cycles. Usually the slurry contains about 1% to about 10% polymer although more or less may be present. It is also possible to utilize the aqueous polymerization slurry directly (with addition of extra water, if necessary or desirable), without separating the polymer crumb therefrom, although this is not usually desired since the aqueous medium of the polymerization slurry contains unreacted monomer, catalyst residues, etc. which, desirably, are removed from the polymer.

The aqueous slurry of acrylonitrile polymer crumb is heated to a temperature which is above the minimum melting temperature of the polymer in the presence of water but not more than about 20° C. above such temperature. It is well known that acrylonitrile polymers do not readily melt without degradation. However, water is an effective melt assistant for acrylonitrile polymers, capable of reducing the melting points of such polymers into the range of about 130° C. to about 180° C. The melting temperatures of the acrylonitrile polymers in the presence of water depends on many variables, such as amount of comonomer content in the polymer, molecular weight of the polymer, chemical nature of the comonomer, etc. Thus, while the melting temperature may be different for each acrylonitrile polymer, determination of this temperature for any specific acrylonitrile polymer is quite easy and straightforward. A mixture or slurry of acrylonitrile polymer crumb and water (about 10–30% polymer in 90–70% water) is heated in a pressure cell until the appearance of the polymer crumb indicates that melting has occurred. Since acrylonitrile polymer crumb as produced normally has polymer molecules having a range of molecular weights and, if comonomers are present, a range of polymer compositions, the polymer really melts, in the presence of water, over a range of temperatures. The minimum melting temperature therefore is the temperature at which an appreciable proportion of the polymer molecules in the crumb have melted in the presence of water even though enough of such molecules have not melted to produce visible changes. This minimum melting temperature is not easily determined experimentally, but is normally only a few degrees (usually not more than about 5–10° C.) below the melting temperature experimentally determined as above-described.

The aqueous slurry for acrylonitrile polymer crumb is heated to a temperature which is above the minimum melting temperature of the polymer in the presence of water in order to achieve the dewatering of the polymer. Heating to a temperature which is too low fails to achieve significant dewatering of the acrylonitrile polymer. Heating to temperatures above the melting temperature of the polymer in the presence of water results in an increase in the water content of the resulting polymer particles after cooling and separating from the slurry and also increases the possibility of polymer degradation being initiated. Therefore, it is preferred that the slurry not be heated to any temperatures more than about 20° C. above the minimum melting temperature of the polymer in the presence of water.

It will be noted that the aqueous slurry is heated to temperatures appreciably in excess of the normal boiling point of water, such temperatures being generally within the range 130° C. to 180° C. To do so, it is necessary that this heating step be performed under superatmospheric pressure. Particularly, the pressure must be at least equal to the vapor pressure of water at the slurry temperature to permit attaining the desired temperature. Thus, this heating step is conducted in any suitable sealed vessel wherein the pressure is achieved (a) because the vessel is completely filled with slurry or, if the vessel is only partially filled, the vapor space thereabove is pressurized by admission of gas under pressure thereto or by evaporation of a small portion of the water in the slurry during heating. The vapor pressures of water corresponding to temperatures between 130° C. and 180° C. are between 39 and 145 pounds per square inch absolute.

After heating the slurry to the designated temperature, the slurry is cooled to below the minimum melting temperature, preferably to below 100° C., and the acrylonitrile polymer particles are separated from the excess liquid of the slurry, as by filtering or centrifuging.

The time for which the slurry is maintained at temperatures above the minimum melting temperature of the polymer in the presence of water can vary widely. The minimum time would appear to be a time sufficient for equilibrium to be reached or approached. The maximum time would appear to be that at which degradation of the polymer starts to become objectionable. Since time as short as a few minutes and as long as an hour gave equivalent results, no effort was made to explore the time limits further.

During the heating and cooling cycle, there is a tendency for the polymer particles to coalesce or fuse together during the time the slurry is at a temperature above the melting temperature of the polymer in the presence of water. Such coalescence is undesirable and can be effectively prevented or minimized by agitation of the slurry while it is at such elevated temperature. If the agitation of the slurry is insufficient, and the polymer particles still coalesce, it is merely necessary to increase the agitation and/or reduce the polymer particle concentration in the slurry until coalescence is substantially prevented. No numerical values can be placed on the amount of agitation since it will depend upon many factors, such as the shape and size of the heating vessel, etc. and amount of agitation cannot really be satisfactorily quantified in general.

After the above-described treatment, it will be found that acrylonitrile polymer crumb of about 40% to about 80% water on weight of crumb (equal to about 67% to about 400% water on weight of bone-dry polymer) has been dewatered to about 15% to about 35% water, preferably less than about 30% water, on weight of polymer particle (equal to about 18% to about 54%, preferably less than about 43%, water on weight of bone-dry polymer) which represents a removal of more than three-quarters, and frequently more than seven-eighths of the water in the original crumb which was not removable merely by filtering or centrifuging. If considered necessary or desirable, some or all of the remaining water associated with the polymer particles can be removed by conventional means, such as evaporative drying.

For a fuller understanding of the invention and additional objects and advantages thereof, reference should be made to the following examples wherein all percentages are by weight. It will be noted that a single polymer was used in all examples to facilitate understanding of the data obtained; however, the same principles apply and similar results can be obtained with other acrylonitrile polymers recognizing that the heating temperatures and resulting water contents may differ slightly from those in these examples.

EXAMPLE 1

A water-jacketed reactor having a volume of 6.78 liters and provided with a motor-driven propeller-type stirrer rotating at about 900 r.p.m. was equipped with a four-feed delivery system and an overflow tube. Prior to start up for continuous polymerization, the reactor was filled with water containing 25 grams of sodium metabisulfite adjusted to a pH of about 2.7 with nitric acid and warmed to 55° C. During continuous polymerization, four feed liquids were metered into the reactor continuously, the reaction temperature was maintained at 55° C., and polymerization slurry continuously overflowed through the overflow tube. The four feed liquids and their feed rates were:

Feed I—2,411 cc./hr. of a mixture of 90.6% acrylonitrile and 9.4% methyl methacrylate monomers containing 5 p.p.m. hydrogen cyanide;
Feed II—591 cc./hr. of an aqueous solution of 10% sodium metabisulfite and 6% sodium nitrate;
Feed III—745 cc./hr. of an aqueous solution of 0.9% sodium chlorate; and
Feed IV—3,033 cc./hr. of deionized water.

During the course of the polymerization reaction, the pH remained at about 2.5–2.6. After equilibrium conditions had been attained (after several hours of operation), samples of the polymerization slurry from the reactor overflow tube were collected and analyzed. The slurry contained about 25.7% polymer solids, the conversion of monomer to polymer was about 85.6%, the polymer composition was about 89.3% acrylonitrile and about 10.7% methyl methacrylate, the polymer had an intrinsic viscosity of 1.48 corresponding to a weight average molecular weight of about 114,000, and the polymer contained about 0.133% sulfur. The reactor overflow slurry was then continuously collected, filtered, washed with water, and the acrylonitrile polymer crumb so produced was packaged to serve as a starting material for the following examples.

EXAMPLE 2

A sample of the polymer crumb as prepared in Example 1 was redispersed in water to give a slurry containing 5% polymer (on a bone-dry basis) in water. The slurry was stirred for about one hour and then centrifuged at 2,200–2,600 r.p.m. for 15 seconds in a size 1, International Centrifuge type SB having a cotton canvas filter. The centrifuged acrylonitrile polymer contained about 60% water and 40% polymer, which represents about 150 parts of water per 100 parts of bone-dry polymer.

EXAMPLE 3

Another sample of the polymer crumb as prepared in Example 1 was redispersed in water to give a slurry containing 25% polymer in water which was then further diluted with water to give a slurry containing about 5% to 10% polymer (on a bone-dry basis) in water. A round bottom pressure vessel provided with stirrer and external heating means was filled to capacity (about two liters) with the slurry. The slurry was heated to between 150° C.–165° C. in the closed pressure vessel while being agitated and was held for several minutes above 150° C. and then rapidly cooled with continuous agitation. The slurry was removed from the pressure vessel, water was decanted, and the polymer was centrifuged as in Example 2. The centrifuged produce, which appeared as fused globules (indicative of the temperature attained having been above the melting temperature), contained about 15% to 20% water, which represents about 18 to 25 parts of water per 100 parts of bone-dry polymer. This crude preliminary experiment (when compared with Example 2) indicated that the process of this invention was capable of rapidly removing at least five-sixths of the water associated with the acrylonitrile polymer crumb without evaporative drying or use of chemical treatments.

EXAMPLES 4–7

Under more carefully controlled conditions, a series of runs similar to Example 3 was conducted using samples of the polymer crumb of Example 1 made into slurries containing 5.0% polymer and 95% water and using the two-liter pressure vessel of Example 3 fitted with an ordinary propeller-type blade rotating at 462 r.p.m. The temperature to which each slurry was heated and the water content of the polymer after centrifuging as in Example 3 are listed in the following table.

TABLE 1

| | | After centrifuging | |
|---|---|---|---|
| | Temperature, ° C. | Percent water | Parts water/ 100 parts polymer |
| Control* | | 59.8 | 149 |
| Example: | | | |
| 4 | 140 | 55.6 | 126 |
| 5 | 145 | 37.4 | 60 |
| 6 | 150 | 30.7 | 44 |
| 7 | 155 | Not measurable, fused** | |

\* This is the product of Example 2 without the heat treatment.
\*\* A fused mass of polymer was obtained at 155° C. which could not be centrifuged. This suggested that the melting temperature of the polymer in the presence of water was below 155° C. and that insufficient agitation and/or insufficinet dilution of slurry were provided in Example 7 whereby substantial coalescence occurred.

The data of Examples 4–6 in Table I shows the drastic reduction of water content achieved at temperatures (145–150° C.) approaching the melting temperature of the polymer in the presence of water, which temperatures are above the minimum melting temperature thereof.

EXAMPLE 8

Three blades were attached to the agitator shaft of the pressure vessel used in Example 7 to increase the amount of agitation provided. Example 7 was repeated using this modified pressure vessel and using a more dilute slurry of the polymer crumb of Example 1, said slurry containing 2.5% polymer solids. The slurry was heated to 155.4° C., cooled, and centrifuged as in Examples 4–7. The resulting product, although not completely uniform, was centrifugeable to give a product containing 22.4% water (equal to 28.9 parts water per 100 parts polymer), representing the removal of over four-fifths of the water associated with the original polymer crumb which was not removable by the centrifuge.

EXAMPLES 9–13

The three blades attached to the agitator shaft in Example 8 were replaced with a disc-type series of blades and the speed of rotation of the stirrer was increased, thereby still further increasing the amount of agitation. A series of runs similar to Example 8 was conducted using samples of the polymer crumb of Example 1 made into slurries containing 2.5% polymer and 97.5% water. The temperature to which each slurry was heated and the water content of the polymer after centrifuging as in Example 8 are listed in the following table.

TABLE II

| | | After centrifuging | |
|---|---|---|---|
| | Temperature, ° C. | Percent water | Parts water/ 100 parts polymer |
| Control* | | 59.8 | 149 |
| Example: | | | |
| 9 | 158.4 | 19.4 | 24 |
| 10 | 158 | 22.5 | 29 |
| 11 | 165 | 24.8 | 33 |
| 12 | 170 | 29.0 | 41 |
| 13 | 177 | 31.6 | 46 |

*This is the product of Example 2 without the heat treatment.

The products resulting from this series of runs above the melting temperature of the polymer in the presence of water were of quite uniform size, indicating that, although the polymer had fused, sufficient agitation was utilized to prevent substantial coalescence of the polymer particles. This series of runs, all above the melting temperature of the polymer in the presence of water, shows that, at higher temperatures the water content of the centrifuged polymer increases somewhat from the maximum dewatering achieved near the polymer melting temperature. At about 158° C., this treatment removed over four-fifths of the water associated with the original polymer crumb which was not removable by the centrifuge. Even at temperatures up to 20° C. above the minimum melting temperature of this polymer in the presence of water, over 70% of the water was removed.

The foregoing examples illustrate the process of the present invention for dewatering one specific acrylonitrile polymer crumb composition. From these examples, it is seen that substantial dewatering of this polymer occurs on heating the slurry to between 150° C. and 175° C. The invention can also be used for dewatering acrylonitrile polymer crumbs of other compositions, as previously described. By performing a series of runs similar to the foregoing examples, the appropriate temperature range to which the slurry must be heated can be readily determined for any specific acrylonitrile polymer composition. 1enerally, the temperature range which can be used will be somewhere between about 130° C. and about 200° C. although rarely will temperatures above about 180° C. be found necessary.

I claim:
1. A process for dewatering acrylonitrile polymer crumb containing at least about 50% combined acrylonitrile produced by polymerizing acrylonitrile, alone or with other monoethylenically unsaturated comonomers copolymerizable therewith, in an aqueous medium comprising:
  (a) heating an aqueous slurry of said acrylonitrile polymer crumb, said slurry containing sufficient water to ensure that said slurry remains easily flowable, to a temperature above the minimum melting temperature of said polymer in the presence of water but not more than about 20° C. above said minimum melting temperature for a time sufficient for melting to occur while under a pressure at least equal to the vapor pressure of water at the slurry temperature and while agitating said slurry sufficiently to prevent substantial coalescence of said polymer;
  (b) then cooling said slurry to below said minimum melting temperature while continuing to agitate said slurry sufficiently to prevent substantial coalescence of said polymer particles; and
  (c) thereafter separating the resultant polymer particles from the excess liquid of the slurry.
2. A process as defined in claim 1 wherein the polymer particles are separated from the excess liquid by centrifuging.
3. A process as defined in claim 1 wherein the polymer particles are separated from the excess liquid by filtering.
4. A process as defined in claim 1 wherein said heating is to a temperature between about 130° C. and about 180° C.
5. A process as defined in claim 1 wherein said aqueous slurry contains between about 1% and about 10% by weight of polymer.

References Cited

UNITED STATES PATENTS

| 2,862,895 | 12/1958 | Cummings et al. | 260—88.7 B |
| 3,198,775 | 8/1965 | DeLacretaz et al. | 260—85.5 R |
| 3,288,707 | 11/1966 | Hurwitz et al. | 260—85.5 S |

HARRY WONG, Jr., Primary Examiner

U.S. Cl. X.R.

204—159.22; 260—29.6 AN, 32.6 N, 63 N, 79.3 M, 78.5 T, 85.5 P, 88.7 B, 88.7 G